Jan. 10, 1950 C. O. SLEMMONS 2,494,066
SELF-LAYING TRACK
Filed Nov. 11, 1944 3 Sheets-Sheet 2
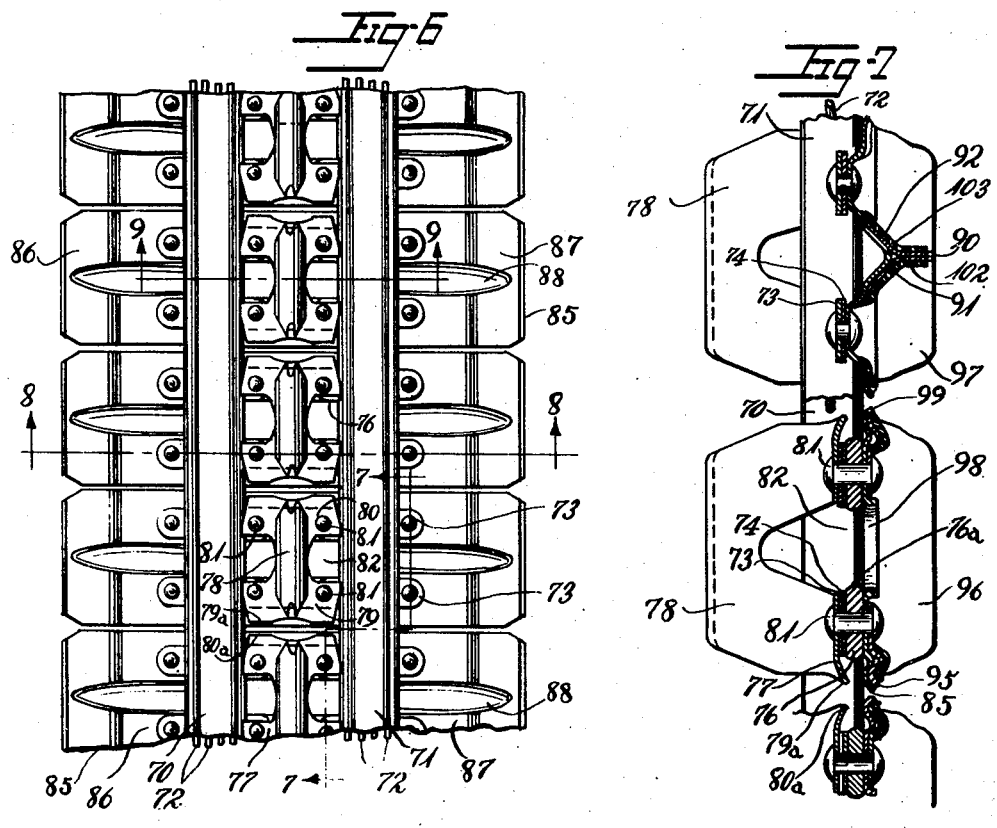
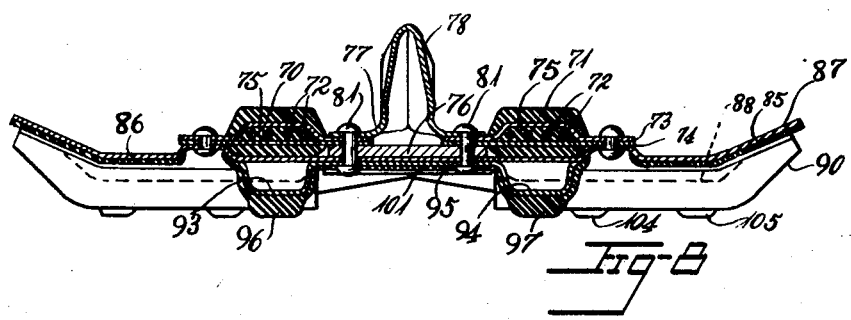
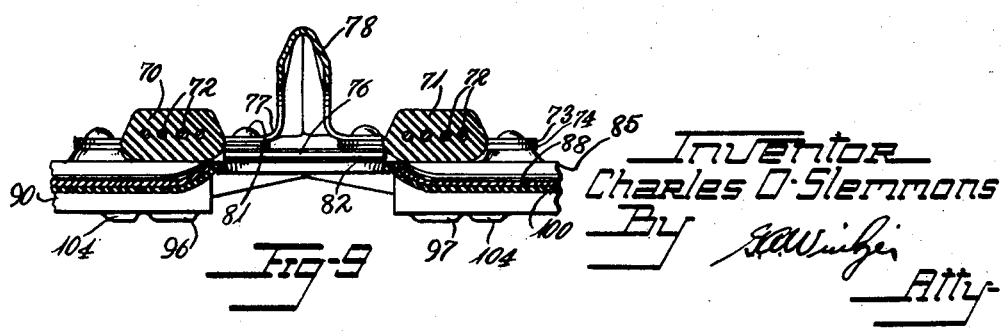
Inventor
Charles O. Slemmons
By
Atty.

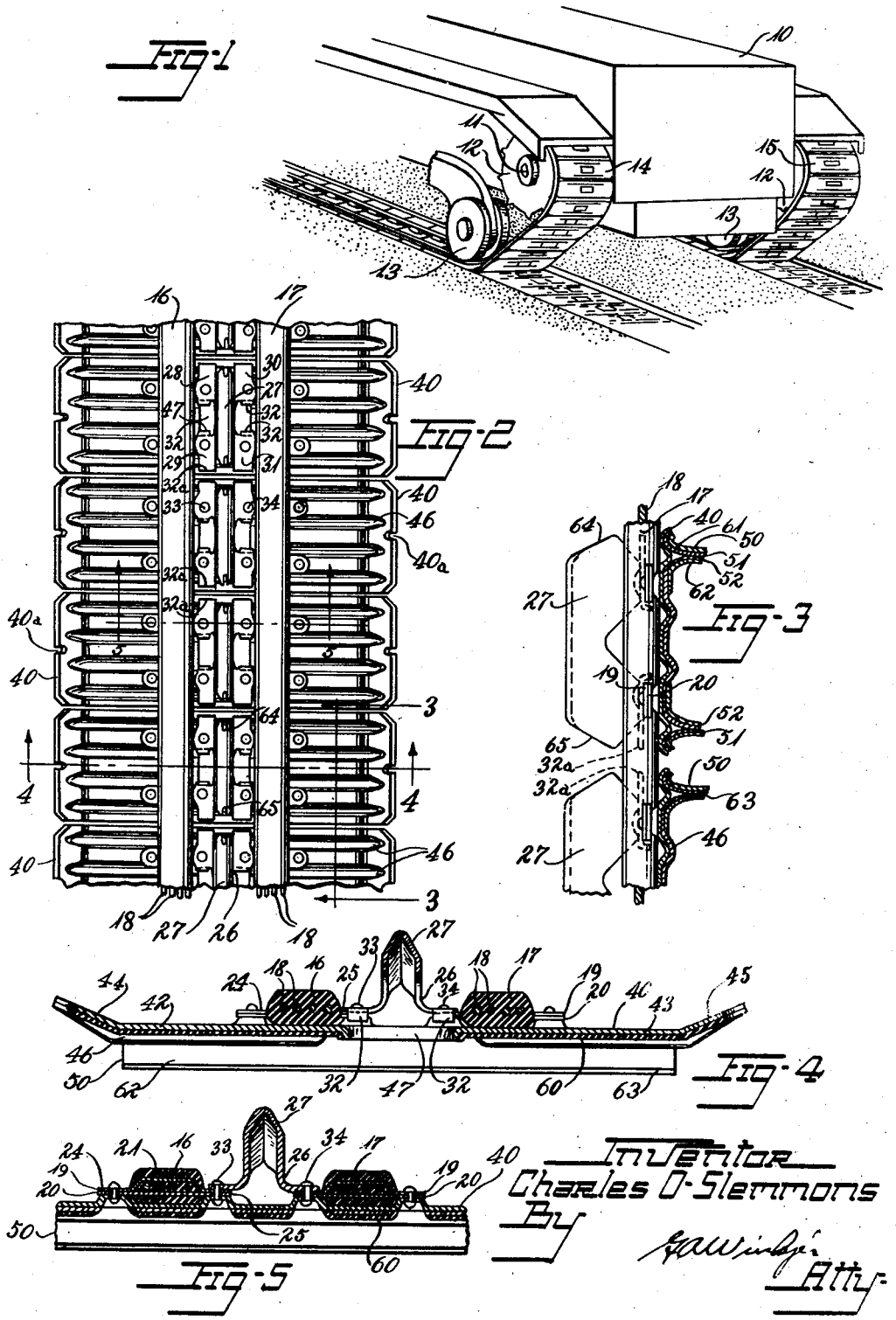

Jan. 10, 1950
C. O. SLEMMONS
SELF-LAYING TRACK
2,494,066
Filed Nov. 11, 1944
3 Sheets-Sheet 3
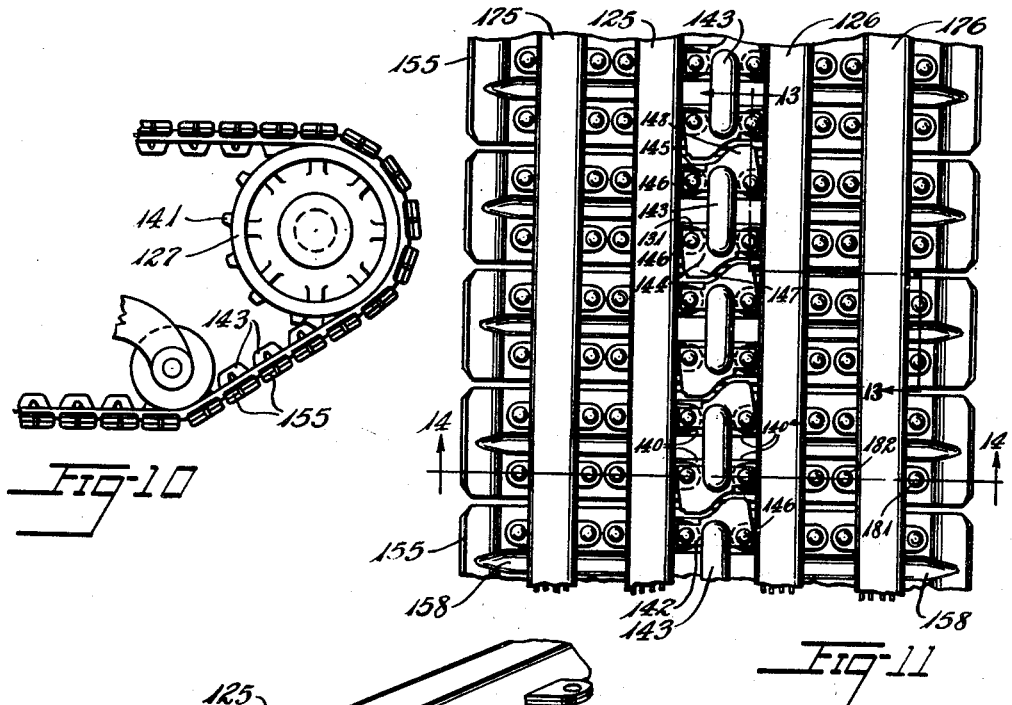
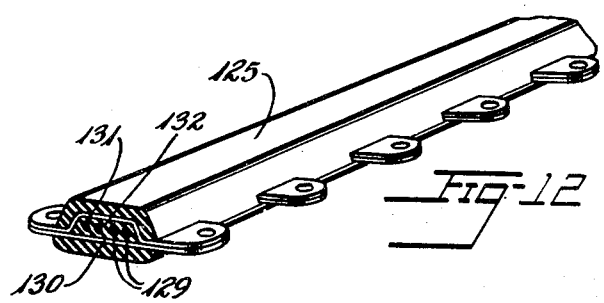
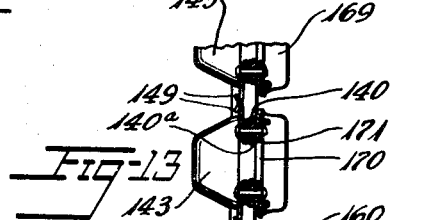
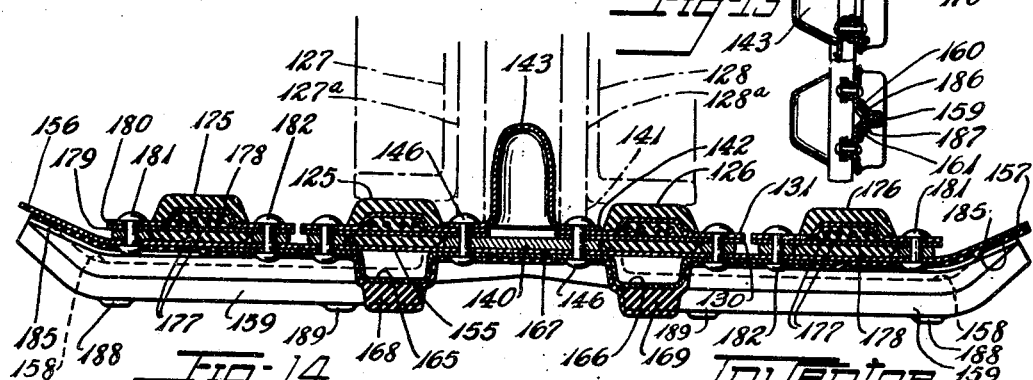
Inventor
Charles O. Slemmons
By
G.A.Winkjer
Atty.

Patented Jan. 10, 1950

2,494,066

UNITED STATES PATENT OFFICE 2,494,066

SELF-LAYING TRACK

Charles O. Slemmons, Akron, Ohio, assignor to
The B. F. Goodrich Company, New York, N. Y.,
a corporation of New York Application November 11, 1944, Serial No. 562,988

20 Claims. (Cl. 305—10)

1

This invention relates to track for self-laying track type vehicles and is especially useful on vehicles to be operated over ice and snow. This application is a continuation-in-part of my application Serial No. 500,517 filed Aug. 30, 1943 entitled Self-laying track, now abandoned.

Objects of the invention are to provide a high degree of flotation over soft snow or mud, to provide traction, to provide high resistance to adhesion of ice and snow, to provide high resistance to wear, to provide traction on hard ice, to provide resilient connection of the shoes and the cables, to provide great transverse stability with shoes of broad lateral extent and light weight, to provide light weight, and to provide facility of construction and repair.

A further object is to provide for increased resistance to lateral twisting or bending while nevertheless maintaining good longitudinal flexibility.

These and other objects will appear from the following description and the accompanying drawings.

Of the drawings,

Fig. 1 is a perspective view of part of a vehicle with tracks thereon made in accordance with and embodying the invention, Fig. 2 is a plan view showing the driving face of a portion of the track, Fig. 3 is a sectional view thereof taken on line 3—3 of Fig. 2, Fig. 4 is a sectional view thereof taken on line 4—4 of Fig. 2, Fig. 5 is a sectional view thereof taken on line 5—5 of Fig. 2, Fig. 6 is a plan view showing the driving face of a portion of a modified embodiment of the invention, Figure 7 is a sectional view thereof taken on line 7—7 of Fig. 6, Fig. 8 is a sectional view thereof taken on line 8—8 of Fig. 6, Fig. 9 is a sectional view thereof taken on line 9—9 of Fig. 6, Fig. 10 is a side elevation of a portion of a further modified form of the invention, parts being broken away, showing one of the driving and guiding wheels and one of the load carrying wheels, Fig. 11 is a plan view of a portion of the track thereof looking at the sprocket engaging face, Fig. 12 is a perspective view of a band member therefor, shown partly in section, Fig. 13 is a longitudinal sectional view thereof, taken on line 13—13 of Fig. 11, and

2

Fig. 14 is a sectional view thereof taken on line 14—14 of Fig. 2, the load-carrying wheels being indicated in dot and dash lines.

In accordance with the invention a pair of bands of resilient rubber-like material, each enclosing tension elements or members, are held in parallel spaced-apart relation by guiding and driving members assembled with and secured to cross members which may be in the form of metal plates or straps embedded in the bands, the bands acting to support the bogie wheels of the vehicle and provide tracks therefor, and also assembled with and secured to flotation members or structures adapted to supply broad tread areas for support on snow, sand, or mud. These flotation members may be of light, strong sheet metal construction and may be faced with rubber-like material to decrease adhesion to snow or ice and to reduce wear of the flotation members. They are relatively wide as compared to the span of the bands which support them and the track may be used with driving and supporting gear that need not be of great width but may have the protection afforded by occupation of only a relatively narrow zone in the center of the track. Other flexible tension members may be provided laterally of the load supporting bands and connected to the flotation members, providing additional lateral stability, especially stability of the track against lateral twisting and bending.

Referring to Figs. 1 to 5 of the drawings, the numeral 10 designates the body of a vehicle having a drive shaft 11, to which are secured drive sprockets such as 12, 12. The weight of the vehicle is supported by bogie wheels such as 13, 13 which bear upon tracks 14, 15 trained about the drive sprockets and the bogie wheels.

The tracks 14, 15 are alike and only one need be described, as follows: A pair of flexible bands 16, 17 of resilient rubber or other rubber-like material, are provided for contacting with the treads of the bogie wheels. Extending through each band in laterally spaced-apart relation are tension elements or members 18, preferably in the form of flexible metal cables, or convolutions of the same cable, to which the rubber-like material is secured as by a bond of vulcanization. Also partially embedded in the resilient material of the bands are complementary pairs of cross straps 19, 20 at spaced-apart intervals longitudinally of the track. Straps 20 are preferably flat, whereas straps 19 are preferably bent or offset near their ends and beyond the reinforcing cables. The arrangement is such that each pair of straps 19, 20 defines a single space 21 therebetween through which the tension members extend surrounded by rubber-like cushioning material, while the ends of the straps extend at the sides of the band in superimposed relation to provide longitudinally spaced-apart apertured fastening ears 24, 25, by which the band may be assembled with and attached or other parts of the track.

For holding the bands 16, 17 in spaced-apart relation and to provide guiding and driving means for the track, connecting members 26 are provided bridging the space between adjacent bands. These members are preferably formed of sheet metal and provide a raised guide 27 and a plurality of apertured ears 28, 29, 30, 31 adapted to be secured to the ears 25, of a plurality of cross straps at each side of the connecting members. The fore and aft margins of ears 28, 29, 30, 31 adjacent sprocket tooth openings 47 may be turned downwardly to provide driving faces 32 for engaging the teeth of the driving sprocket for driving the track. The connecting members are secured to the bands 16, 17 as by rivets 33, 34. The ends of the ears 28, 29, 30, 31 away from the sprocket teeth openings 47 are preferably extended as platforms 32a which may be in relatively close proximity so as to prevent sprocket teeth from entering anywhere except in the openings 47, and owing to the locations of these platforms approximately in the pitch line, flexure of the track does not cause interference of these platforms.

For supporting the track and the vehicle on snow, sand, or soft mud, or other flowable material, shoes 40 of broad area, preferably of sheet metal, are provided. These shoes extend a considerable distance laterally beyond the bands 16, 17 to provide supporting wings 42, 43 having upwardly turned tips 44, 45 to facilitate turns on soft snow. To strengthen the shoes the material thereof is formed with ribs or corrugations 46 extending in a direction crosswise of the track. Openings 47 for escape of snow, soil or other material are provided in the shoes between the bands 16 and 17. Slots 40a may be provided in the tips of the shoes to secure removable grousers, if desired.

For additionally strengthening the shoes, and to provide grousers for increasing traction, transversely extending cleats 50 of metal are secured to the tread faces of the shoes, as by welding. These cleats may also be made of sheet metal and, to provide great strength in the direction of travel, are each formed of strips 51, 52 of generally angular cross-section welded or otherwise secured to each other back to back.

To provide resistance to adhesion of snow and ice and to provide greater resistance to abrasion, the shoes 40 may be provided on their tread faces with a layer 60 of resilient rubber or other rubber-like material bonded or otherwise secured to the metal. The cleats may be provided with surface coverings 61, 62 of resilient material for the same purpose. The edges of the cleats 50 are, however, preferably exposed as at 63 and the angle pieces 51, 52 may be arranged to provide a stepped edge as shown to provide a relatively sharp biting edge of metal to grip surfaces such as ice. For providing additional strength thereto, the metal providing the sides of the guides 27 may be welded together along the forward and rearward edges 64, 65 of the sides.

The track is particularly light in weight while providing a great area for ground contact providing high flotation on snow, sand, mud, or other flowable material. At the same time noise is reduced and cushioning provided by the rubber covered bands 16, 17 which provide resilient tracks for the bogie wheels. The assembled construction greatly facilitates manufacture and makes possible conservation of materials.

In the modification shown in Figs. 6 to 9 of the drawings, the numerals 70, 71 designate a pair of flexible bands of resilient rubber or other rubber-like material, similar to the bands 16, 17 of the track of Fig. 2, for contacting with the treads of the bogie wheels. Extending through each band in laterally spaced-apart relation are tension elements or members 72, preferably in the form of flexible metal cables or convolutions of the same cable, to which the rubber-like material is secured as by a bond of vulcanization. Also partially embedded in the resilient material of the bands are complementary pairs of cross straps 73, 74 at spaced-apart intervals longitudinally of the track. Straps 74 are preferably flat, whereas straps 73 are bent or offset near their ends and beyond the reinforcing cables. The arrangement is such that each pair of straps 73, 74 defines a single space 75 therebetween through which the tension members extend surrounded by rubber-like cushioning material, while the end of the straps extend at the sides of the band in superimposed relation to provide longitudinally spaced-apart apertured fastening ears by which the band may be assembled with and attached to other parts of the track.

For holding the bands 70, 71 in spaced-apart relation and to provide guiding and driving means for the track, bearing blocks 76 of hardened steel span the space between the inwardly directed ears of the straps 73, 74 and have a rounded margin 76a transverse of the track for contacting the sprocket teeth of the driving sprocket. Above the bearing blocks and the ears of the straps overlapping them, connecting and guiding members 77 are provided. Each connecting and guiding member 77 is formed of sheet metal to provide an upstanding guide member 78 intermediate the bands. Each connecting and guiding member longitudinally spans two of the bearing blocks and has longitudinally spaced-apart ears 79, 80 at each side of its guide member which each overlap the ears of the cross strap and the bearing blocks and are secured thereto by rivets 81. At their fore and aft margins, the connecting and guiding members extend as platforms 79a, 80a which closely approach each other so as to prevent the entrance of a drive sprocket tooth therebetween, while at the centers of the connecting and guiding members an opening 82 is provided between the ears at each side of the guiding member to receive the sprocket teeth. Thus, the sprocket teeth are compelled to re-enter their assigned openings in case of jumping. If desired, the platforms 79a, 80a may be curved as shown in Fig. 7 for added strength. As these platforms are located approximately in the pitch line of the track they do not interfere with one another upon flexure of the track.

For supporting the track and the vehicle on snow, sand, soft mud, or other readily flowable material, shoes 85 of broad area, preferably of light weight and sheet metal, are provided. These shoes extend a considerable distance laterally beyond the bands, 70, 71 to provide supporting wings 86, 87 having upwardly turned tips to facilitate making turns on soft snow.

To strengthen the shoes, each is formed with a deep laterally extending corrugation 88 midway of its fore and aft margins providing lateral stiffness. For additionally strengthening the shoes and providing traction on soft ground, a cleat 90 is formed of angle sections 91, 92 of sheet metal arranged back to back and welded to each other and to the shoe with their projecting edges offset or in stepped relation as shown in Fig. 3 so as to form a sharp cross cleat at the center of each shoe.

For providing a tread surface capable of supporting the shoes against tipping due to line contact with the ground, the sheet metal pieces which provide the angle sections 91, 92 are formed with box-like extensions 93, 94 fore and aft of the cleat 90 and beneath the bands 70, 71, connected by a web 95 through which rivets 81 are secured. Cushion treads 96, 97 are secured to the metal as by a bond of vulcanization for providing a substantially flat contact with the ground and preventing rocking of the shoe.

The material of the shoes is formed with apertures 98 for clearing the sprocket teeth and the margin about each aperture is strengthened by a surrounding downwardly turned flange 99.

To provide resistance to adhesion of snow and ice and to provide greater resistance to abrasion the shoes 85 and the cleats 90 may be provided on their tread faces with surface coverings 100, 101, 102, 103 of resilient rubber or other rubber-like material having a low adhesion to ice and secured to the metal preferably by a bond of vulcanization. The edges of the cleats are also similarly protected but the covering soon wears through at the sharp edges of the cleats to provide a sharp biting edge of metal to grip surfaces such as ice, or if desired the edges may be exposed initially. The edges are preferably formed with portions 104, 105 which project below the remainder of the cleat edge to provide calks for entering the ice.

Referring to the modified form of the invention illustrated in Figs. 10 to 14 of the drawings, longitudinally-extending flexible bands 125, 126 of resilient rubber or other rubber-like material, similar to bands 16, 17 of the track of Fig. 2 are provided in spaced-apart relation for contacting the treads of the load supporting bogie wheels and also the driving wheels 127, 128. Sprockets 127a, 128a are secured to the driving wheels 127, 128 in a position to clear the bands and guide members and to engage the bearing blocks of the shoes, hereinafter described. Extending through each band in laterally spaced-apart relation are tension elements or members 129 extending in straight parallel reaches, preferably in the form of flexible metal cables or convolutions of the same cable, to which the rubber-like material is secured, as by a bond of vulcanization. Also partially embedded in the resilient material of the bands are complementary pairs of cross straps 130, 131 at spaced-apart intervals longitudinally of the track. Straps 130 are preferably flat, whereas straps 131 are bent or offset near their ends and beyond the reinforcing cables. The arrangement is such that each pair of straps 130, 131 defines a single space 132 therebetween through which the tension members extend surrounded by rubber-like cushioning material, while the ends of the straps extend at the sides of the band in superimposed relation to provide longitudinally spaced-apart apertured fastening ears by which the band may be assembled with and attached to other parts of the track.

For holding the bands 130, 131 in spaced-apart relation and to provide guiding and driving means for the track, bearing blocks 140 of hard metal, such as hardened steel, span the space between the inwardly directed ears of the straps 130, 131 and have a rounded margin 140a transverse of the track for contacting the sprocket teeth 141. The bearing blocks 140 are located in spaced-apart relation longitudinally of the track so that the teeth 141 may enter therebetween. Above the bearing blocks and the ears of the straps over-lapping them, connecting and guiding members 142 are provided. Each connecting and guiding member 142 is formed of sheet metal to provide a seamless upstanding guiding member 143 intermediate the bands. Each connecting and guiding member longitudinally spans two of the bearing blocks and has longitudinally spaced-apart footings 144, 145 each of which transversely spans adjacent ears of strap members 130, 131 over the bearing blocks and is secured thereto by rivets 146. The footings of successive guide members are formed with extensions 147, 148 which bridge the space between the successive bearing blocks to which they are respectively secured in side by side relation, the extensions being nonsymmetrically disposed as to the centerline of the track to break joints. The footings of each guide member are spaced apart longitudinally of the track to provide spaces therebetween for receiving the sprocket teeth 141. Thus the sprocket teeth are compelled by the arrangement of footings to reenter their assigned openings in case of jumping. If desired the footings may be curled at their fore and aft margins, as at 149 for added strength. As these margins are located approximately at the pitch line of the track they do not interfere with one another upon flexure of the track.

For supporting the track and the vehicle on snow, sand, soft mud, or other readily flowable material, shoes 155 of broad area, preferably of light sheet metal, are provided. These shoes extend a considerable distance laterally beyond the bands 125, 126 to provide supporting wings 156, 157 having upwardly turned tips to facilitate making turns on soft material.

To strengthen the shoes, each is formed with a deep laterally extending corrugation 158 midway of its fore and aft margins providing lateral stiffness. For additional strengthening of the shoes and providing traction on soft ground, a cleat 159 is formed of angle sections 160, 161 of sheet metal arranged back to back and welded to each other and to the shoe laterally of the track so as to form a sharp cross cleat at the center of each shoe.

For providing a tread surface capable of supporting the shoes against slipping due to line contact with the ground, the sheet metal pieces which provide the angle sections 160, 161 are formed with box-like extensions 165, 166 fore and aft of the cleat 159 and beneath the bands 125, 126 connected by a web 167 through which the rivets 146 are secured. Cushion treads 168, 169 are secured to the metal as by a bond of vulcanization for providing a substantially flat contact with the ground and preventing rocking of the shoes.

The material of the shoes is formed with apertures 170 for clearing the sprocket teeth 141 and the margin about each aperture is strengthened by a surrounding downwardly turned flange 171.

To provide additional lateral stability to the wings 156, 157 of the shoes and to reduce torsional distortion of the track and to distribute locally applied loads while maintaining longitudinal flexibility of the track, longitudinally disposed flexible tension members 175, 176 are arranged near the tips of the wings and secured to each wing. These may each be like the member 125, in the form of a group of laterally spaced-apart tension elements 177, such as wire cables or convolutions of the same cable embedded in a strip 178 of rubber or other rubber-like resilient material. The cables are enclosed in a bight formed between pairs of strap members 179, 180 located at longitudinally spaced-apart intervals, as in the strips 125. The straps 179 are straight whereas the straps 180 are bent or offset to provide the bight enclosing the tension members. The straps extend laterally beyond the strip 178 to provide superimposed lateral ears having apertures whereby they are secured to the wings of the shoes by rivets 181, 182. The tension elements serve to hinge the shoes to each other near their tips and to distribute the load on a shoe to adjacent shoes, thereby providing greater stability.

To provide resistance to adhesion of snow and ice and to provide greater resistance to abrasion, the shoes and the cleats with surface coverings 185, 186, 187 of resilient rubber or other rubber-like material having a low adhesion to ice are secured to the metal preferably by a bond of vulcanization. The edges of the cleats are also similarly protected but the covering soon wears through at the sharp edges of the cleats to provide a sharp biting edge of metal to grip surfaces such as ice, or if desired the edges may be exposed initially. The edges are preferably formed with portions 188, 189 which project below the remainder of the cleat edge to provide calks for entering the ice.

Variations may be made without departing from the scope of the invention as it is defined by the following claims.

I claim:

1. A track for self-laying track type vehicles, said track comprising a plurality of separate parallel flexible bands constituting individual units each comprising longitudinally disposed tension elements embedded in rubber-like material, cross straps individual to a band and associated with the tension elements extending laterally through the band and providing attaching portions at its sides, the attaching portions of the cross straps of one band being spaced laterally of the track from the attaching portions of an adjacent band, and means secured to said portions of said straps connecting said bands in laterally spaced-apart relation for separate removal and replacement.

2. A track for self-laying track type vehicles, said track comprising a pair of separate parallel flexible bands constituting individual units each comprising longitudinally disposed tension elements embedded in rubber-like material, cross straps individual to a band and separated from said tension elements by the rubber-like material and secured to the rubber-like material and extending laterally through the band and providing attaching portions at its sides, the attaching portions of the cross straps of one band being spaced laterally of the track from the attaching portions of an adjacent band, and means secured to said portions of said straps connecting said bands in laterally spaced-apart relation for separate removal and replacement.

3. A track for self-laying track type vehicles, said track comprising a pair of separate parallel flexible bands constituting individual units each comprising longitudinally disposed tension elements embedded in rubber-like material, cross straps individual to a band extending laterally through the band and providing attaching portions at its sides, the attaching portions of the cross straps of one band being spaced laterally of the track from the attaching portion of an adjacent band, and means secured to said portions of said straps connecting said bands in laterally spaced-apart relation for separate removal and replacement said connecting means having surfaces for engaging a track-driving sprocket.

4. A track for self-laying track type vehicles, said track comprising a pair of separate parallel flexible bands constituting individual units each comprising longitudinally disposed tension members embedded in rubber-like material, cross straps individual to a band extending laterally through the band and providing attaching portions at its sides, the attaching portions of the cross straps of one band being spaced laterally of the track from the attaching portion of an adjacent band, and means secured to said portions of said straps for connecting said bands in laterally spaced-apart relation for separate removal and replacement said connecting means having a surface for engaging a track-guiding wheel.

5. A track for self-laying track type vehicles, said track comprising a plurality of separate parallel flexible bands constituting individual units each comprising longitudinally disposed tension elements embedded in rubber-like material, cross straps individual to a band extending laterally through the band and providing attaching portions at its sides, the attaching portion of the cross straps of one band being spaced laterally of the track from the attaching portion of an adjacent band, and means secured to said portions of adjacent bands for connecting them in laterally spaced-apart relation for separate removal and replacement said connecting means comprising a ground-engaging shoe.

6. A track for self-laying track type vehicles, said track comprising a plurality of separate parallel flexible bands constituting individual units each comprising longitudinally disposed tension elements embedded in rubber-like material, cross straps individual to a band extending laterally through the band and providing attaching portions at its sides, the attaching portions of the cross straps of one band being spaced laterally of the track from the attaching portion of an adjacent band, and means secured to said portions of adjacent bands for connecting them in laterally spaced-apart relation for separate removal and replacement said connecting means comprising a tread shoe, and said shoe having a ground-engaging cross cleat.

7. A track for self-laying track type vehicles, said track comprising a plurality of separate parallel flexible bands constituting individual units each comprising longitudinally disposed tension elements embedded in rubber-like material, cross straps individual to a band extending laterally through the band and providing attaching ears at its sides, the attaching portions of the cross straps of one band being spaced laterally of the track from the attaching portion of an adjacent band, and means secured to the ears of adjacent bands for connecting them in laterally spaced-apart relation for separate removal and replacement said connecting means

Certificate of Correction

Patent No. 2,494,066 January 10, 1950

CHARLES O. SLEMMONS

It is hereby certified that errors appear in the printed specification of the above numbered patent requiring correction as follows:

Column 8, lines 13, 28, 44, 59, and 75, after the word "replacement" insert a comma; lines 38 and 39, same column, for "portion" read *portions*;

and that the said Letters Patent should be read with these corrections therein that the same may conform to the record of the case in the Patent Office.

Signed and sealed this 18th day of July, A. D. 1950.

[SEAL]

JOE E. DANIELS,
*Assistant Commissioner of Patents.*